UNITED STATES PATENT OFFICE.

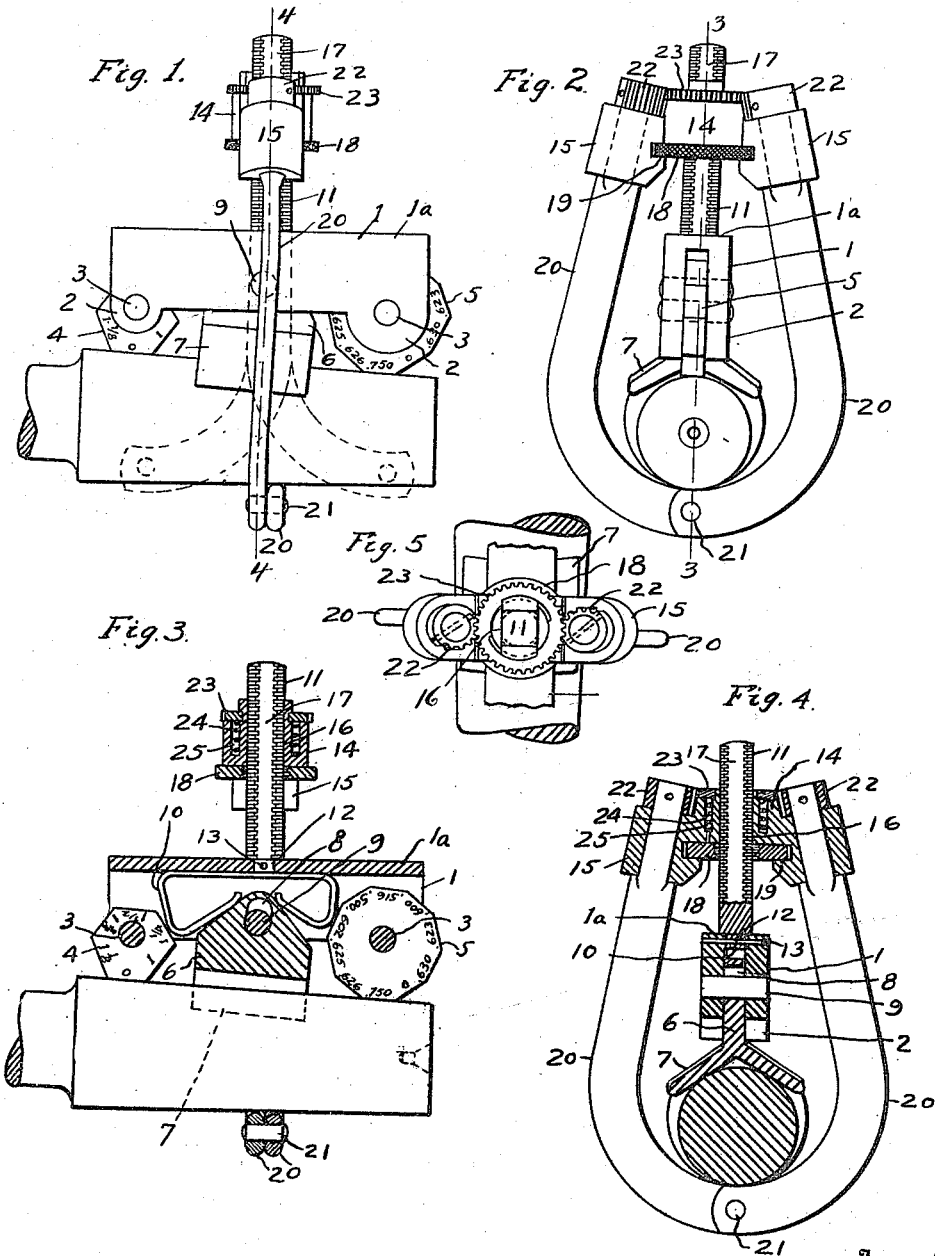

LOWELL C. BLOMSTROM, OF DETROIT, MICHIGAN.

TAPER-GAGE.

1,268,814.   Specification of Letters Patent.   Patented June 11, 1918.

Application filed June 11, 1917. Serial No. 173,942.

*To all whom it may concern:*

Be it known that I, LOWELL C. BLOMSTROM, a citizen of the United States, residing at Detroit, in the county of Wayne and State of Michigan, have invented a new and useful Taper-Gage, of which the following is a specification.

This invention relates to taper gages and its object is to provide a gage that may be employed in conjunction with a micrometer gage, or other suitable calipers, to insure the accurate machining of a piece of work to any one of a large number of tapers.

Another object is to make possible the application of the gage to work in a lathe without necessitating removal of such work, and to provide a simple adjustable clamping mechanism for holding the gage to the work while a micrometer gage is being employed.

In attaining these objects, the invention contemplates mounting upon a suitable body one or more rotatable polygonal gage members, having a series of flats or edge faces differentially distanced from their axes, the faces of each gage member being adapted to respectively co-act with an edge face of another gage member to determine a plurality of planes having known inclinations to a gaging surface of said body.

A preferred structural embodiment of the essential features of the present invention is illustrated in the accompanying drawings, in which, Figure 1 is a side view of the herein described gage showing the same in position of use upon a tapered spindle.

Fig. 2 is an end view of the same.

Fig. 3 is a section taken on line 3—3 of Fig. 2.

Fig. 4 is a section taken on line 4—4 of Fig. 1.

Fig. 5 is a fragmentary top view.

Referring to the various parts by the reference characters applied thereto in the several views, 1 designates an arch-shaped frame or body, the top of which has a plane surface $1^a$, and the sides have opposite semicircular depending portions 2 at each end. In each pair of opposed portions 2 a pin 3 is mounted transversely of the frame 1, and rotatable polygonal gage members 4 and 5 are journaled respectively on the pins 3. The members 4 and 5 differ in size and each has its flat edge faces differentially spaced from its center. One or both side faces of each gage member carries indicia for identifying its respective edge faces, the smaller member 4 being marked 0, 1, $1\frac{1}{8}$, $1\frac{1}{4}$, $1\frac{3}{8}$, $1\frac{1}{2}$, each of which markings indicates in inches per foot a taper obtainable by the use of the face which said marking identifies. The larger gage member 5 has one of its edge faces marked 0 and the others respectively identified by decimal indicia .750, .630, etc., the same expressing various tapers in decimal fractions of an inch per foot. There is a certain relation between the distances from the centers to the edge faces of the two disks by virtue of which the tapers expressed by said indicia may be determined, this being hereinafter more fully discussed.

Between the gage members 4 and 5 there is mounted a three-armed work-positioning member of inverted Y-shape, having its stem portion 6 extending between the side walls of the frame 1 and the two work-engaging arms 7 diverging from one another at an acute angle below said frame. The stem 6 is apertured at 8 for engagement with a supporting pin 9 mounted in the side walls of the frame 1. The aperture 8 is slightly elongated vertically so as to allow the member 6, 7 to undergo a slight vertical adjustment. Between said member 6, 7 and the top of the frame 1, a spring 10 is mounted, the end portions of which engage the arm 6 of the member 6, 7 exerting downward pressure upon said member, and also engage the gage members 4 and 5 so as to yieldably resist rotation of said members.

From the top of the frame member 1, a screw-threaded post 11 projects rigidly upward, said post having a reduced extremity 12 fitting into an aperture in the top of the frame 1 and retained therein by a pin 13. Upon said post there is adjustably mounted a head comprising a central portion 14 and portion 15 projecting oppositely from said central portion. Said head is centrally formed with a square opening 16 through which the post 11 passes and said post is partially squared as indicated at 17 so that it may have such engagement with the opening 16 as will prohibit rotation of the head without preventing longitudinal adjustment thereof. To effect such an adjustment there is engaged with the threads of the post 11 a knurled nut 18, disposed just below the central portion 14 of the head and periphery engaging in slots 19 oppositely formed in the portions 15 of said head.

Said portions 15 respectively form bearings wherein are respectively journaled the upper ends of a pair of arms 20, which arms extend in a slightly divergent relation to each other at each side of the body 1. The lower extremities of said arms are curved so as to normally engage each other, and one of said extremities carries a pin 21 which enters an opening in the other arm when the arms are in engaged relation. Above the bearing-forming member 15, the arms 20 carry mutilated pinions 22 with which meshes an intermediate pinion 23 journaled upon the central portion 14 of the adjustable head at the top of said portion. The pinion 23 is rotatively acted upon by a spring 24 coiled beneath said pinion in an annular recess 25 formed in the member 14, said spring acting upon the arms 20 through the pinions 22 and 23 to resist disengagement of said arms by rotation and to return said arms to an engaged relation after any displacement from such a relation.

In using the above described device, the polygonal gage members are first rotatively adjusted according to the taper which it is desired to give the work. Thus, for example, if the desired taper is 1⅛ inches to the foot, the member 4 is rotated to bring the side marked 1⅛ undermost and the member 5 is adjusted to bring the face marked 0 undermost. If the piece of work to be gaged is in a lathe as is generally the case, the arms 20 are now rocked in the bearing-forming members 15 to spread the curved ends of said arms and allow the two gage members 4 and 5 to be placed in contact with the tapered surface, as is seen in the drawing. The arms 20 being then released will be swung by the spring 24 into their normal position of engagement as shown in full lines in the drawing. By rotation of the knurled nut 18, the head 14, 15 is now adjusted upwardly upon the post 11 until the work is firmly clamped between the curved ends of the arms 20 and the two gage members 4 and 5. The positioning member 6, 7 during this clamping tends to insure the gage members engaging the work at points diametrically opposite the point where the clamping member applies its stress. The gage having been clamped in place, a micrometer gage is applied between the under surface of the work and the gaging surface 1ª of the body 1, parallelism of said surfaces being a requisite if the work has been machined to the desired taper.

If the axes of the two gage members 4 and 5 are arranged to lie in a plane paralleling the gaging surface 1ª, as the drawing discloses, then the difference in the distances from the centers of the gage members to the edge faces thereof, that are used in conjunction, determines the inclination of the angle of taper requisite to insure parallelism between the gaging surface 1ª and the under surface of the body to which the gage is applied. It is obvious, however, that the invention may also be embodied in a structure having the axes of the gage members in a plane inclined to the gaging surface 1ª, in which case the degree of the angle of such inclination would be a factor effecting the proportioning of the gage members.

It will be understood that the angle of taper of any body indicated by parallelism of the under surface of said body with the gaging surface 1ª is one-half of the actual angle formed by the plane of the co-acting edge faces of the gage members with the surface 1ª, but the indicia associated with said edge faces will indicate the taper of the body to which the gage is applied rather than said actual angle.

What I claim is:—

1. In a taper gage, a body having a plane gaging surface, a polygonal gage member rotatably mounted upon said body, having its axis parallel to said gaging surface, and having its peripheral faces differentially distanced from its axis, and a coacting gage member upon said body spaced from said polygonal member, and having a surface adapted to co-act with the peripheral faces selectively of said gage member in different positions of rotation of the latter to determine planes respectively corresponding to said peripheral faces and having known inclinations to the gaging surface of said body.

2. In a gage, a body having a plane gaging surface, a polygonal gage member rotatably mounted upon said body, having its axis parallel to said gaging surface, and having its peripheral faces differentially distanced from its axis, a co-acting member upon said body spaced from said polygonal member, and having a surface adapted to co-act with the peripheral faces selectively of said gage member in different positions of rotation of the latter to determine planes respectively corresponding to said peripheral faces and having known inclinations to the gaging surface of said body, and means engaged with said body for clamping the two said co-acting plane-determining surfaces against a tapered body.

3. In a taper gage, a body having a plane gaging surface, a polygonal gage member rotatably mounted upon said body, having its axis parallel to said gaging surface, and having its peripheral faces differentially distanced from its axis, a co-acting gage member upon said body spaced from said polygonal member, and having a surface adapted to co-act with the peripheral faces selectively of said gage member in different positions of rotation of the latter to determine planes respectively corresponding to said peripheral faces and having known inclinations to the gaging surface of said body, a post secured to said body substantially perpendicular to said gaging surface, a head adjustable upon said post, and clamping means carried by said head engageable with a tapered body to clamp the same against said polygonal member and the co-acting gage member.

4. In a taper gage, a body having a plane gaging surface, a polygonal gage member rotatably mounted upon said body, having its axis parallel to said gaging surface, and having its peripheral faces differentially distanced from its axis, a co-acting gage member upon said body spaced from said polygonal member, and having a surface adapted to co-act with the peripheral faces selectively of said gage member in different positions of rotation of the latter to determine planes respectively corresponding to said peripheral faces and having known inclinations to the gaging surface of said body, a post secured to said body substantially perpendicular to said gaging surface, a head adjustable longitudinally of said post, a pair of clamping arms journaled at corresponding ends in said head and extending one at each side of said body, the other ends of said arms being bent to adapt them to swing into or out of juxtaposition through rocking of said arms.

5. In a taper gage, a body having a plane gaging surface, a polygonal gage member rotatably mounted upon said body, having its axis parallel to said gaging surface, and having its peripheral faces differentially distanced from its axis, a co-acting gage member upon said body spaced from said polygonal member, and having a surface adapted to co-act with the peripheral faces selectively of said gage member in different positions of rotation of the latter to determine planes respectively corresponding to said peripheral faces and having known inclinations to the gaging surface of said body, a post secured to said body substantially perpendicular to said gaging surface, a head adjustable longitudinally of said post, a pair of clamping arms journaled at corresponding ends in said head and extending one at each side of said body, the other ends of said arms being bent to adapt them to swing into or out of juxtaposition through rocking of said arms, pinions respectively mounted upon said arms adjacent said head, a gear journaled upon said head in mesh with said pinions and a spring engaging said gear, and acting rotatively upon said arms through said gear, and pinions to normally retain said arms in juxtaposition.

6. In a taper gage, a body having a plane gaging surface, a polygonal gage member rotatably mounted upon said body, having its axis parallel to said gaging surface, and having its peripheral faces differentially distanced from its axis, a co-acting member upon said body spaced from said polygonal member, and having a surface adapted to co-act with the peripheral faces selectively of said gage member in different positions of rotation of the latter to determine planes respectively corresponding to said peripheral faces and having known inclinations to the gaging surface of said body, a screw-threaded post secured to said body substantially perpendicular to said gaging surface, a head longitudinally adjustable upon said post but restrained from rotation relative thereto, a nut engaging said post for adjusting the head thereupon, and clamping means carried by said head for clamping a tapered body against said polygonal member and co-acting gage member.

7. In a taper gage, a body having a plane gaging surface, a polygonal gage member rotatably mounted upon said body, having its axis parallel to said gaging surface and having its peripheral faces differentially distanced from its axis, a co-acting gage member upon said body spaced from said polygonal member, and having a surface adapted to co-act with the peripheral faces selectively of said gage member in different positions of rotation of the latter to determine planes respectively corresponding to said peripheral faces and having known inclinations to the gaging surface of said body, a post secured to said body, substantially perpendicular to said gaging surface, a head adjustable longitudinally of said post, clamping means carried by said head for clamping a tapering body against said polygonal gage member and the co-acting gage member, a work positioning member mounted between said gage members upon the body carrying the same, and means yieldably pressing the work positioning member away from said gaging surface.

8. In a taper gage, a body having a plane gaging surface, and a pair of polygonal gage members rotatably mounted upon said body, in spaced relation, the peripheral faces of each of said members being differentially distanced from its axis, and one of the faces of each of said members being adapted to co-act with faces of the other to determine planes having known inclinations to the gaging surface of the body.

9. In a taper gage, a body having a plane gaging surface, a pair of polygonal gage members rotatably mounted upon said body, in spaced relation, the peripheral faces of each of said members being differentially distanced from its axis, and the faces of said members being adapted to co-act selectively with each other and collectively with the gaging surface of said body to determine planes having known inclinations, and means engaged with said body for clamping said gage members against a tapered body.

10. In a taper gage, a body having a plane gaging surface, and a pair of different sized polygonal gage members rotatably mounted upon said body in spaced relation, their axes being parallel with and equi-distant from said gaging surface, the edge faces of each of said members being differentially spaced from its axis, and the proportioning of each gage member with respect to the distance of its edge faces from its axis having a relation to the distance of one of the edge faces of the other gage member from its axis, such that the edge faces of the first mentioned gage member are respectively adapted to co-act with said edge face of the second mentioned gage member to determine planes having known inclinations to the gaging surface of said body.

11. In a taper gage, a body having a plane gaging surface, a pair of polygonal gage members rotatably mounted upon said body, in spaced relation, the peripheral faces of each of said members being differentially distanced from its axis, and the faces of said members being adapted to co-act selectively with each other and collectively with the gaging surface of said body to determine planes having known inclinations to said gaging surface, a post secured to said body substantially perpendicular to the gaging surface of said body, a head longitudinally adjustable upon said post, a pair of clamping arms journaled at corresponding ends in said head and projecting one at each side of said body, the other ends of said arms being bent to extend in proximity in one position of rotative adjustment of the arms, said bent ends being adapted to engage at one side of a tapered body to clamp the same into engagement with said gage members at its other side.

12. In a taper gage, a grooved body, having a plane gage surface extending opposite its groove, a pair of polygonal gage members rotatably mounted in the groove of said body, the edge faces of said members being differentially spaced from their axes, and said faces of each member being adapted to respectively co-act with an edge face of the other gage member to determine planes having a known inclination to the gaging surface of said body, a Y-shaped work positioning member having its stem portion extending into the groove of the body intermediate the polygonal members, a common means yieldably bearing upon each polygonal member to resist rotation thereof and yieldably pressing said positioning member away from the gaging surface of said body, and a clamping member engaged with said body having portions adjustable to or from the polygonal members for clamping the latter against the work.

In testimony whereof I sign this specification.

LOWELL C. BLOMSTROM.

Copies of this patent may be obtained for five cents each, by addressing the "Commissioner of Patents, Washington, D. C."